E. R. EVANS.
CONTROL APPARATUS.
APPLICATION FILED FEB. 5, 1921.

1,416,804.

Patented May 23, 1922.
2 SHEETS—SHEET 1.

INVENTOR
Earl R. Evans

E. R. EVANS.
CONTROL APPARATUS.
APPLICATION FILED FEB. 5, 1921.

1,416,804.

Patented May 23, 1922.
2 SHEETS—SHEET 2.

INVENTOR
Earl R. Evans

UNITED STATES PATENT OFFICE.

EARL R. EVANS, OF GREAT BARRINGTON, MASSACHUSETTS.

CONTROL APPARATUS.

1,416,804.  Specification of Letters Patent.  Patented May 23, 1922.

Application filed February 5, 1921. Serial No. 442,851.

*To all whom it may concern:*

Be it known that I, EARL R. EVANS, a citizen of the United States, residing at Great Barrington, in the county of Berkshire and State of Massachusetts, have invented certain new and useful Improvements in Control Apparatus, of which the following is a specification.

My invention relates to electrical controlling apparatus. It is particularly adapted for use in connection with the drum type of electrical circuit controller commonly used in motor-control systems, such as that shown in U. S. Patent #1,343,232 to Simmon, issued June 15, 1920.

One object of my invention is to provide a manually-operated circuit controller with electro-responsive means, such as an electro-magnet-operated latch, whereby the circuit controlling elements may be locked in a predetermined position.

A further object of my invention is to provide a manually-operated circuit controller having a plurality of operative positions with indicating means to warn the operator to return the controller to a predetermined position under certain conditions.

A further object of my invention is to provide a control system including electro-responsive means for regulating the operation of a circuit controller and a remote switch for actuating the electro-responsive means whereby remote supervisory control of the circuit controller is obtained.

Other objects of my invention will be apparent from the following detailed description taken in connection with the accompanying drawings, wherein I have illustrated a preferred embodiment of the invention:

Figure 1:
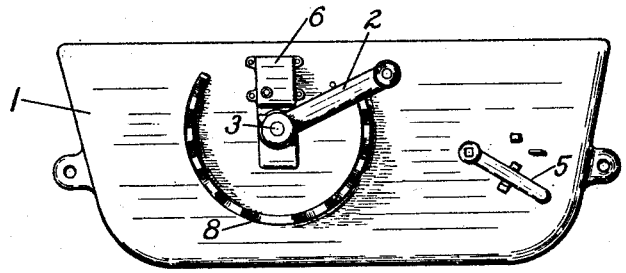
Fig. 1 is a plan view of a drum type of controller constructed in accordance with my invention.
Figure 2:
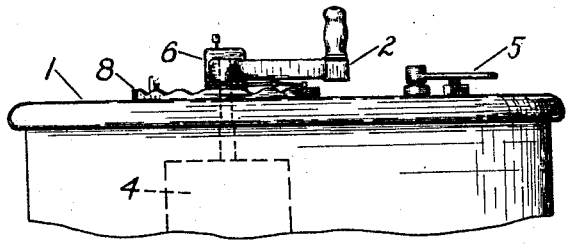
Fig. 2 is a fragmentary side view of the controller of Fig. 1.

Referring to the drawings, 1 represents the casing of a drum controller such as is used for controlling the motor circuits of a trolley car. The operating handle 2 is mounted on the shaft 3 of the main controller drum 4, and 5 is the usual reversing-switch handle. Adjacent the handle 2 is a casing 6 containing an electro-magnet 7 and the elements controlled thereby. Surrounding the drum shaft 3 is a detent plate 8 mounted on the top of the controller casing. On the handle 2 is pivoted the lever 9 which engages the detent plate 8 at the outer end and the spring plate 10 at the inner end 9'. The plate 10 is pivoted at 11 and is biased upwardly by the coiled spring 12. As the handle is actuated the lever 9 intermittently depresses the plate 10 by reason of the configuration of the detent plate 8, as will be readily understood. A latch 13, normally out of engagement with the plate 10, may be actuated by the cam 14 so as to engage the under side of the plate 10 and hold it in its uppermost position.

The cam 14 is pivoted at 15 and is adapted to be actuated by the armature 16 of the electro-magnet 7. When the electro-magnet 7 is energized, the armature in its closing movement rocks the cam 14 about the pivot 15. The portion 17 of the cam engages the flexible strip 13' which carries the latch 13 and thrusts the latch 13 into the path of the plate 10. The flexibility of the support 13' permits the cam to be actuated even though the plate 10 is depressed. The portion 17 is flattened so that the cam will remain in the actuated position when the magnet is de-energized. The cam 14 also carries a projecting lug 18 (see Fig. 5) which cooperates with the locking pin 19. The locking pin 19 is biased by the spring 20 into locking engagement with the hub-plate 21 of the handle 2 (shown in dotted lines in Fig. 5).

I have shown the pin 19 as adapted to lock the controller drum in the initial or "off"

position, the hub-plate 21 being keyed to the drum shaft 3. The hub-plate 21 is provided with a projection 22 riding in a slot 23 in the hub 24 of the handle. The hub-plate 21 is connected to the hub 24 by a spring 25 which holds the projection 22 in one end of the slot 23. This structure provides a small amount of lost-motion between the handle 2 and the shaft 3 in case the shaft is locked, the tension of the spring tending to bias the handle to the "off" position.

Figure 6:
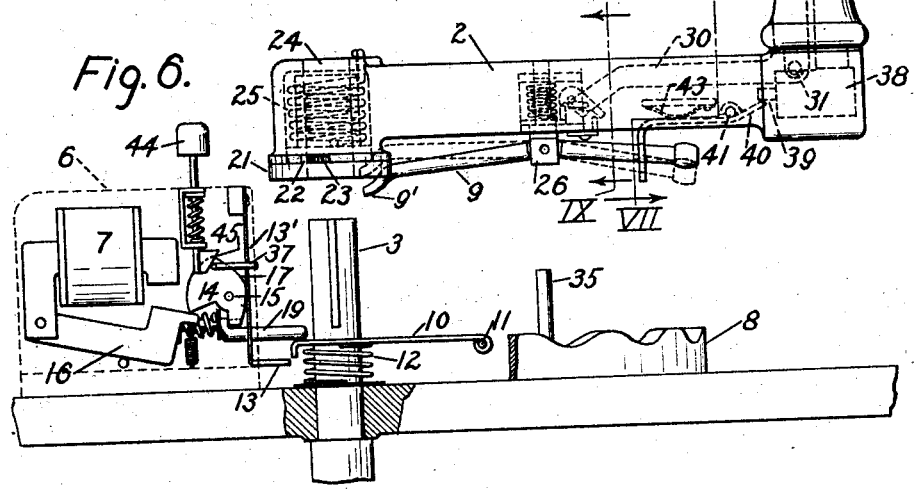
Fig. 6 is a side view of the apparatus shown in Fig. 5, partially disassembled.

The lever 9 is pivoted to the pin 26 carried by the handle 2. The pin 26 (see Fig. 8) is slidably mounted in the handle but is normally held in the position shown by the stiff spring 27. A washer 28 carried by the pin 26 cooperates with a pivoted member 30 through the agency of the rocker 29. The member 30 is pivoted at 31 and comprises an upstanding portion 30' shaped to conform to the portion of the handle 2 which is grasped by the operator of the controller. The rocker 29 and the horizontal portion of the lever 30 constitute a toggle connection, the rocker carrying a pin 32 which rides in a slot in the lever. Springs 33 hold the toggle yieldingly in either of its extreme positions. If the washer 28 is lifted, it rocks the member 29, the pin 32 riding to the other end of the slot thereby depressing the lever 30. This projects the portion 30' from its slot in the handle, as indicated in Fig. 6, so that it is sensible to the touch of the operator who grasps the handle. The toggle cannot be returned to its initial position by pressing on the lever arm 30', but a pivoted lever 34 cooperating with the pin 35 is provided to reset the toggle when the handle is returned to the "off" position.

Figure 5:
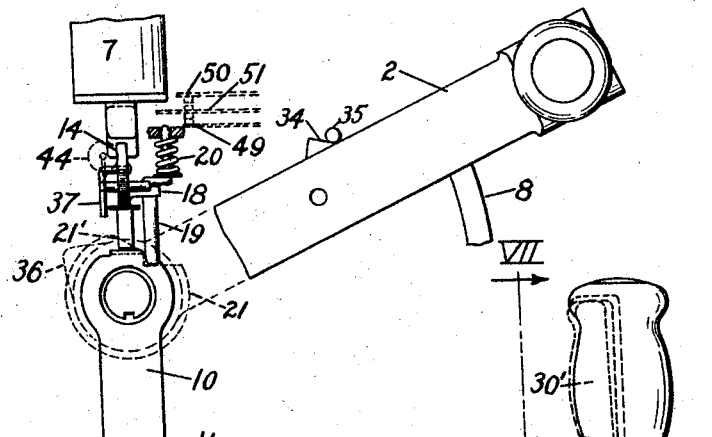
Fig. 5 is a detailed plan view of the controller handle and associated apparatus, parts being omitted for the sake of clearness.

The operation of the apparatus shown is briefly as follows:—with the controller handle in the "off" position as shown in Fig. 5, the controller drum shaft is locked as long as the magnet 7 is de-energized. The handle 2 may be moved toward the second position however by reason of the slot 23, which movement places the spring 25 under tension. When the magnet 7 is energized, the armature 16 withdraws the locking pin 19 by means of the cam 14 and lug 18. The release of the controller drum shaft is apparent to the operator grasping the handle 2, who now "notches" the handle around in the usual manner. In order that a single electro-magnet may be used for controlling the locking pin 19 in the "off" position and the latch 13 in the other positions of the controller handle, the hub 24 of the handle is provided with a portion 36 (see Fig. 5) cooperating in the second position of the controller handle with the resetting pin 37 to return the cam 14 to its initial position.

The initial movement from the "off" position does not effect the engagement of plate 10 with the latch 13, but as the handle is swung through the "running" positions the plate 10 is intermittently depressed and raised as the lever 9 rides over the detent plate 8, by reason of the fact that the spring 27 is much stiffer than the spring 12. If the electro-magnet 7 is energized however during this movement of the controller handle the plate 10 is held in its uppermost position by the latch 13, and upon further movement of the handle the lever 9 rocks about the point 9' as a fulcrum, thereby lifting the pin 26, which sets the toggle 29—30 and projects 30' from the handle. To return the projecting arm 30' it is necessary to swing the handle to the "off" position.

The notches in the detent plate 8 preferably coincide with the contact-making positions of the controller drum and handle, so that the handle is yieldably held in these positions during its actuation, and the function of the detent mechanism usually provided is obtained. By this arrangement the plate 10 is depressed only a small part of the time, so that ordinarily the latch 13 slides freely into latching position. If however the cam is actuated while the plate 10 is depressed the flexible part 13' of the latch insures subsequent movement of the latch when the plate 10 is released.

In the event that it is desired to leave the arm 2 stationary in a certain position, say the final position, the arm 30' is projected from the handle in case the plate 10 has been latched in its upper position by simply rocking the handle. The handle has a shank 38 pivotally mounted to permit a slight rocking movement of the handle and carrying pins 39 (see Figs. 6 and 7) bearing upon a plate 40 pivoted at 41 to the handle and provided with a slot 42 through which the lever 9 extends. Rocking the handle in either direction from its central position will raise the outer end of the lever 9 and either depress the plate 10 or actuate the toggle 29—30 depending on the position of the latch 13. A flat spring 43 holds the handle normally in its central or upright position.

To enable the operator to release the controller drum at will, a push button 44 having a cam portion 45 cooperating with the pin 37 is provided. Depressing the button 44 rocks the cam 14 to withdraw the locking pin 19.

Figure 3:
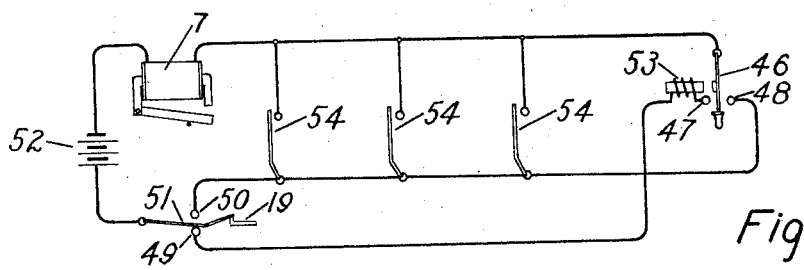
Figs. 3 and 4 are diagrammatic views of control circuits embodying my invention.
Figure 4:
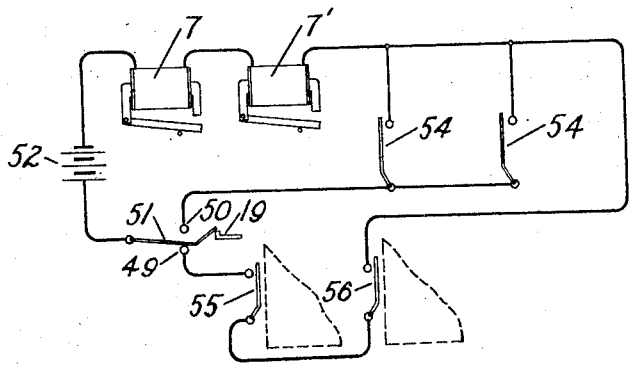

The specific embodiment of my invention which I have illustrated is particularly adapted for use in connection with train-control systems. The controller 1 may control the circuits of the driving motors of the car. The operation of the controller handle is governed by the electro-magnet 7. In Figs. 3 and 4 I have shown control circuits for the electro-magnet 7. The switch 46 is moved into contact with 47 by the "conductor" when it is desired to start the car. The magnet 7 is now energized through the normally closed contacts 49, 51 and battery 52, thereby unlocking the controller. A series magnet 53 holds the contacts 46, 47 closed as long as the circuit is complete, so that the controller remains unlocked. When the controller handle is actuated, the circuit is broken at 49, 51 and contact is made between 50 and 51 by means of the pin 19 (see Fig. 5) which is projected against the contact arm 51 by the cam surface 21' of the hub-plate 21. The switches 54 and 46, 48 are now in circuit with the electro-magnet 7. Closure of one of these switches by a passenger who desires to stop the car latches the plate 10 in its uppermost position, so that "notching" of the controller or rocking the handle projects the element 30' from the handle, as has been described, which serves as a warning to the operator to stop the car. Ordinarily the required manipulation of the controller will operate the indicator 30', but if a scheduled stop is approached without apparent necessity for slackening speed, it is a simple matter for the operator to ascertain if any occupant of the car desires to get off—i. e., whether a "stop" switch has been closed—by rocking the handle in either direction.

Figures 7, 8, 9:
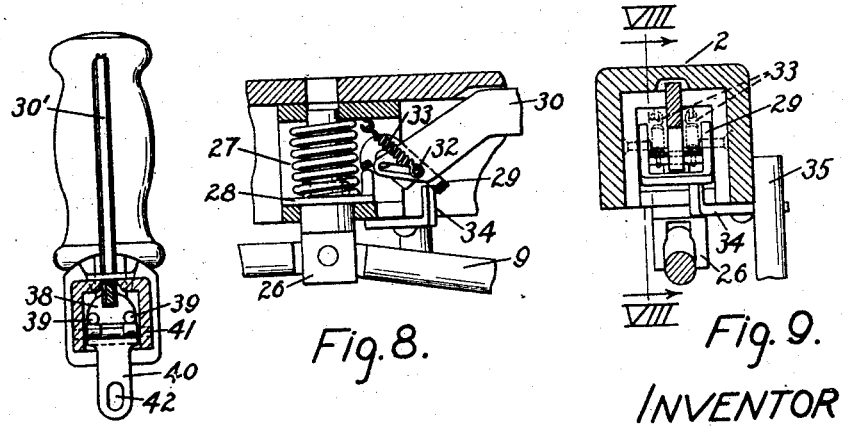
Fig. 7 is a sectional view on line VII—VII of Fig. 6.
Fig. 8 is a sectional view on line VIII—VIII of Fig. 9.
Fig. 9 is a sectional view to an enlarged scale on the line IX—IX of Fig. 6.

My invention may be applied to multiple unit trains having a plurality of controllers. In Fig. 4, 7 and 7' represent the control magnets of which there is one for each controller. The windings of the magnets are in series, and instead of the starting switch 46, 47, door-operated switches shown diagrammatically at 55 and 56 connected in series are provided, so that when all of the doors are closed, the electro-magnets 7, 7' are simultaneously energized and the controllers released. "Stop" switches 54 may be provided as before.

By my invention I have provided a simple and effective secondary control for the controller of a prime mover, such as an electric motor. When applied to a trolley controller, it eliminates the loss of time and the uncertainty attendant upon the audible signalling arrangement commonly used for starting and stopping the car. More satisfactory service and a faster running schedule are made possible.

By providing a positive lock for the "off" position and an impositive control or indicating arrangement for the "running" positions, the operation of the controller is made relatively simple. The position of the "stop" indicating device on the handle of the controller permits the operator to concentrate his main faculties on the road ahead. The indicating device is actuated by the manipulation of the controller, the controlling magnet being merely required to operate a latch and therefore is relatively small. The alternative, manually-operated release for the lock places the controller entirely under the control of the operator at all times.

In accordance with the provisions of the patent statutes, I have herein described a concrete embodiment of my invention but I desire to have it understood that the apparatus shown is only illustrative and that the invention can be carried out by other means. Furthermore, while the various elements of the invention are shown in the relation in which it is contemplated they shall be used, some of the elements may be altered and others omitted without interfering with the more general results outlined and the invention extends to such modifications.

What I claim as new and desire to secure by Letters Patent is:

1. A controller comprising a control member having a plurality of operative positions including an "off" position, means for normally locking the control member in the "off" position, electro-responsive means for releasing the control member, and a remote switch for actuating said electro-responsive means.

2. A controller according to claim 1, comprising indicating means actuated by the electro-responsive means.

3. A control system for regulating the actuation of a circuit controller comprising electro-responsive means for controlling the actuation of the circuit controller from the "off" position and for operating an indicator in a "running" position of the controller, a switch for actuating said electro-responsive means, a second switch for actuating said electro-responsive means, and means for connecting one or the other of said switches in circuit with said electro-responsive means according to the position of the circuit-controller.

4. In a circuit controller, a contact member having a plurality of operative positions, means for locking the contact member in a predetermined position, electro-responsive means for releasing the contact member, and alternative manually-operable releasing means for said locking means.

5. In a circuit controller, a contact member having a plurality of operative positions, an operating handle for the contact member, indicating means carried by the handle so as to be sensible to the touch of of the operator, and means for actuating said indicating means under predetermined conditions.

6. In a circuit controller, a contact member having a plurality of operative positions, an operating handle for the contact member, indicating means carried by the handle so as to be sensible to the touch of the operator, means for locking said contact member in the "off" position, and electro-responsive means for releasing said locking means and for actuating said indicating means under predetermined conditions.

7. An attachment for a circuit controller which is adapted to be manually operated comprising an operating handle, a hub member adapted to be secured to the circuit controller, a lost-motion connection between said hub member and said handle, a spring for taking up the lost motion, a latch engaging said hub member to lock the controller in a predetermined position, and means for releasing the latch.

8. An attachment for a circuit controller which is adapted to be manually operated comprising an operating handle and a latch device for locking the handle in a predetermined position including a latch element engaging the handle, electro-responsive means for releasing the latch element, and alternative manually-operable releasing means.

9. An attachment for a circuit controller which is adapted to be manually operated comprising an operating handle, indicating means on said handle sensible to the touch of the operator, a latch engaging the handle to lock the same in a predetermined position, and means for releasing the latch and for actuating said indicating means.

10. An attachment for a circuit controller which is adapted to be manually operated comprising an operating handle, indicating means on said handle sensible to the touch of the operator, and electro-responsive means for actuating said indicating means.

11. An attachment for a circuit controller which is adapted to be manually operated comprising an operating handle, indicating means on said handle sensible to the touch of the operator, a detent member co-operating with said handle, an electro-responsive device, and means whereby movement of said handle over said detent member actuates said indicating means when said electro-responsive device is energized.

12. An attachment for a circuit controller which is adapted to be manually operated comprising an operating handle, a detent member co-operating with said handle, indicating means on said handle sensible to the touch of the operator, means whereby said indicating means is actuated under certain conditions upon operative movement of said handle over said detent member, and alternative means whereby said indicating means may be actuated under certain conditions without operative movement of said handle.

13. An attachment for a circuit controller which is adapted to be manually operated comprising an operating handle, a member pivoted to said handle and having a portion adapted to project outside said handle in one position of said member, a rocker co-operating with said pivoted member to form a toggle connection therewith, means for moving said rocker to break the toggle and project said portion of said pivoted member outside the handle, and means operable upon return of the handle to the "off" position for resetting the toggle.

14. In combination, a circuit controller adapted to be manually operated, a latch normally locking the controller in the "off" position, means for releasing the latch, a remote device for controlling said releasing means, and means whereby actuating said device operates said releasing means to unlock the controller and normally maintains the controller unlocked until it is actuated but permits re-locking of the controller if desired before it is actuated.

EARL R. EVANS.